United States Patent Office 3,326,207
Patented June 20, 1967

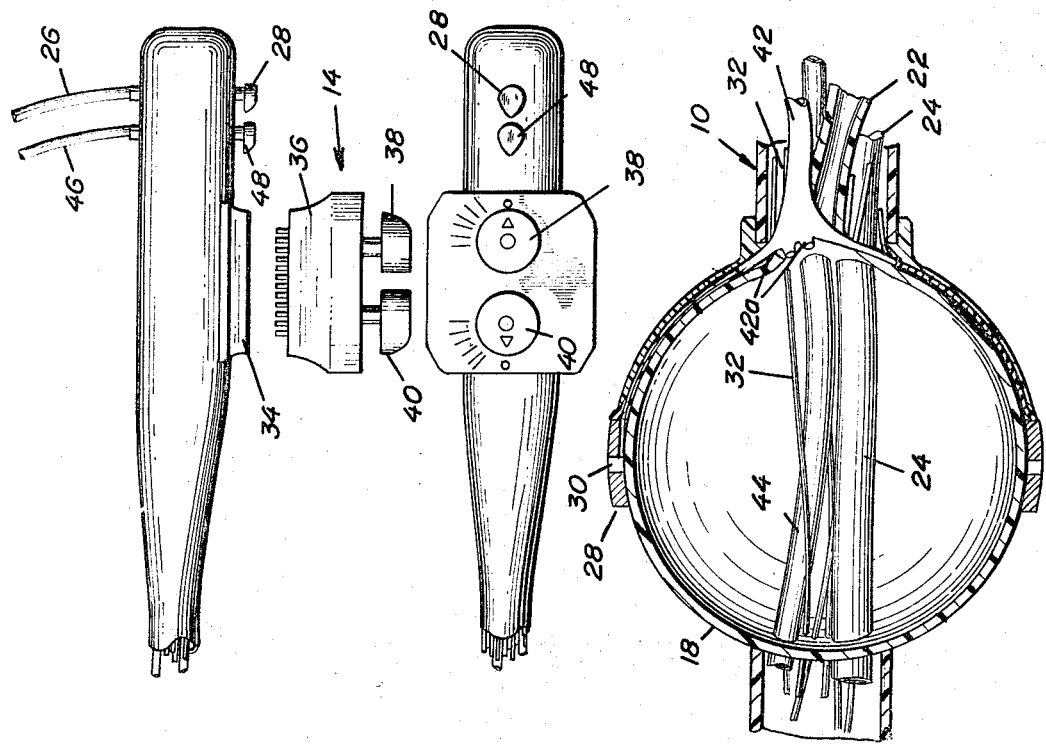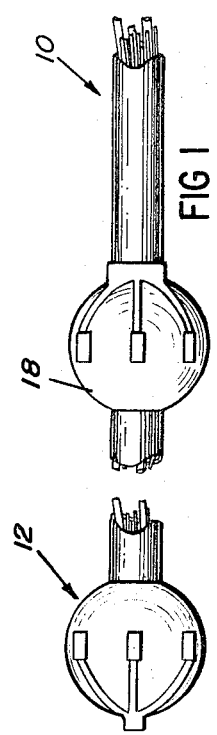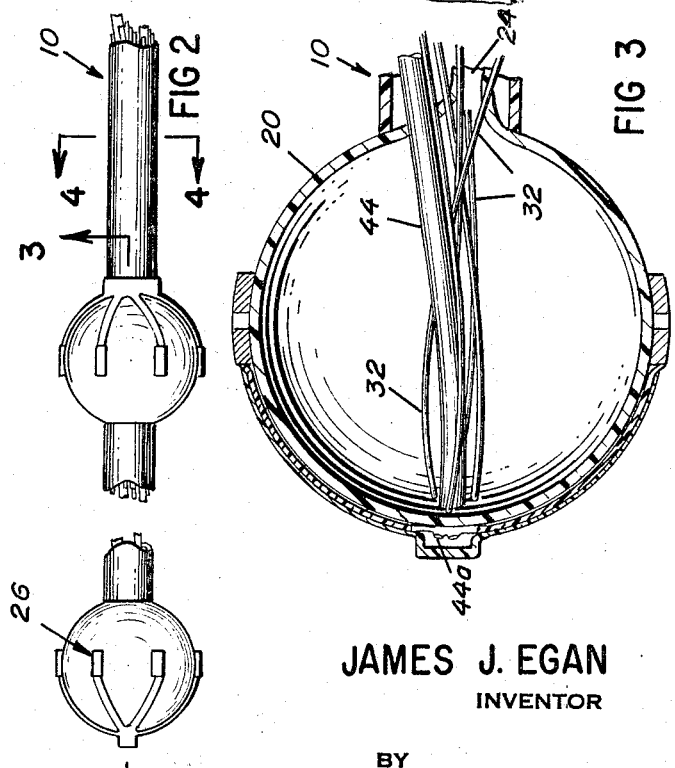
JAMES J. EGAN
INVENTOR
BY
Jacobi & Davidson
ATTORNEYS

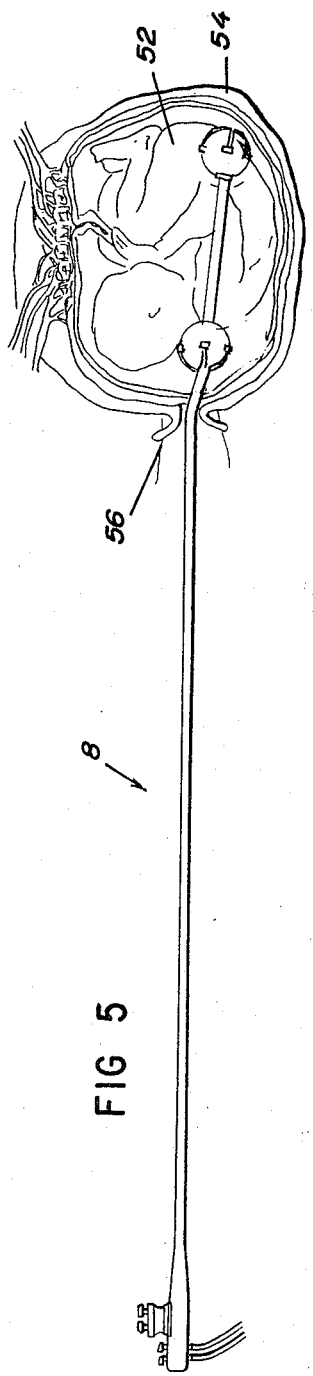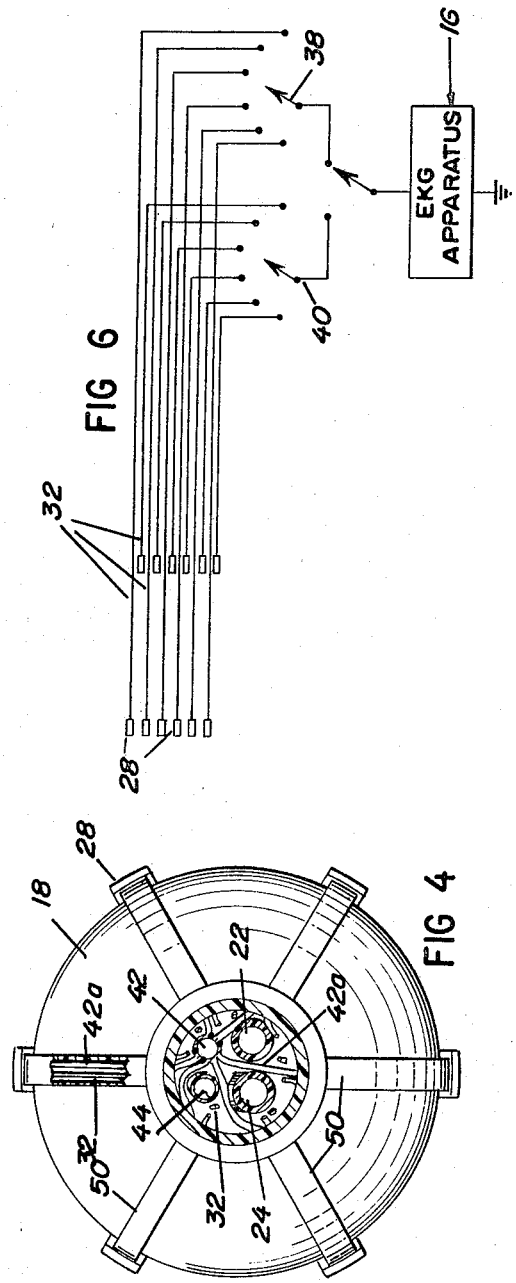

3,326,207
ELECTROCARDIAC INSTRUMENT FOR TESTING UNBORN INFANTS
James J. Egan, Chapel Hill, N.C.
(79 Marvin Road, Ormond Beach, Fla. 32074)
Filed July 10, 1964, Ser. No. 381,790
13 Claims. (Cl. 128—2.06)

This invention relates to electrocardiography and more particularly it relates to an instrument and method for obtaining an electrocardiographic tracing directly from an infant's body surface while the infant is still intrauterine.

When an expectant mother goes into labor, it is important to determine whether the infant to be born shortly thereafter will be delivered in a healthy condition or whether some special treatment or equipment will be needed at the time of birth. By being provided with information as to the infant's condition just prior to birth, the attending doctors are able to anticipate the problems to be encountered and thus to improve the chances of overcoming such problems.

One very satisfactory manner of analyzing an unborn infant's condition is by use of an electrocardiographic apparatus which gives a tracing of the infant's heartbeat pattern. The heartbeat pattern is compared to a normal or standard tracing to determine the condition of the infant. If the pattern corresponds substantially to the standard, then the attending doctors can expect the delivery to be routine. If, however, the tracing shows a "distress pattern," which is one that deviates greatly from the standard, then the attending doctors recognize immediately that complications may be present at delivery and may thus prepare for the necessary steps in treating such complications.

It should be apparent from the foregoing material that it is both desirable and beneficial to provide some method and means for taking an electrocardiographic tracing from an unborn infant, but heretofore no satisfactory technique has been developed for accomplishing such a feat. The method which is most commonly used at present involves taking a set of readings off the expectant mother's abdomen, sometimes with a clamp on the infant and sometimes with no clamp at all. One problem with such a system is that the mother's heartbeat tracing generally superimposes upon and drowns out the infant's heartbeat tracing, and in order to get a reading of the infant's wave, it is necessary to greatly amplify the electrocardiographic signals. Naturally, the equipment to perform such amplification is costly and delicate and somewhat cumbersome for convenient use. However, an equally significant problem, or an even more significant one, is the fact that there is no known point of reference for the infant's reading, even if a clamp is used. Different areas of the body emit different electrical pulses and in order to achieve accurate electrocardiographic results, comparative readings must be taken from different known areas of the body so that, for example, a hip reading and a shoulder reading may be compared. In the commonly used method described above, there is no way of determining from what portion of the infant's body the reading is taken, and thus the results of the reading cannot be accurately and usefully interpreted.

There have been other suggested techniques in the past for taking an electrocardiograph from an infant by intrauterine methods, but such techniques were unsuccessful because they were harmful to either the infant or the mother, or because the contractions during labor tended to move the instrument electrodes so that they could no longer give accurate readings.

With the foregoing matter in mind, it is, therefore, a primary object of the present invention to overcome the shortcomings and deficiencies associated with previously known systems, techniques and instruments and to provide in their stead, an improved method and means for obtaining an electrocardiographic tracing from an unborn infant.

Another primary object of the present invention is to provide an instrument for intrauterine insertion to contact at least two spaced points along the body of an unborn infant to obtain an electrocardiographic reading therefrom.

Further general, though equally significant, objects of the present invention include the provision of an electrocardiac instrument which: (a) is relatively small and smooth and can be easily inserted into and withdrawn from the mother's uterus without injuring either the mother or the infant; (b) will press firmly against the infant and will remain in contact even during a uterine labor contraction; (c) can be readily manipulated to touch only the infant and not the surrounding uterine wall; (d) contacts a plurality of separate points along the infant's body to allow comparative readings; (e) is constructed to permit a conductive solution to be dispensed between the instrument and the infant to assure that electrical contact is satisfactorily made; and (f) is sterilizable to allow for multiple reusage.

The foregoing objects are attained by providing an instrument formed with an elongated hollow tube having an electrode or distal end and a switch or proximal end. The electrode end is adapted to be inserted into the uterus of an expectant mother and includes at least a pair of inflatable balloons having electrode plates positioned circumferentially about the exterior surfaces thereof. The balloons are separately inflatable within the uterus to bring at least one electrode plate on each inflated balloon into contact with the infant. The switches at the proximal end of the instrument can be varied in position until it is experimentally determined which of the electrode plates on each balloon is contacting the infant. Thereafter, a conductive solution is supplied to each of the electrode plates to assure that an electrical contact is established between the plate and the infant. By then attaching the switch output to a conventional electrocardiographic apparatus, it is possible to obtain tracings directly from the infant's body. Since the different balloons are located at different spots on the infant's body, the impulses will have different reference points which can be comparatively analyzed.

Referring to the drawings:

FIGURE 1 is a side elevational view of an instrument in accordance with the principles of the present invention;

FIGURE 2 is a plan view of the instrument of FIGURE 1.

FIGURE 3 is an enlarged sectional view taken substantially along line 3—3 of FIGURE 2;

FIGURE 4 is an enlarged sectional view taken substantially along line 4—4 of FIGURE 2;

FIGURE 5 is a diagrammatic side elevational view showing the instrument in operation; and FIGURE 6 is a schematic view illustrating the manner in which the instrument is connected with a conventional electrocardiographic apparatus.

Referring now to FIGURES 1 and 2, it can be seen that, in general, the invention comprises an instrument generally designated 8 having an elongated tubular member generally designated 10 and having at one end thereof, an inflatable means generally designated 12. At the opposite end of the member 12, an electrical means generally designated 14 is provided and is adapted to be attached to a conventional electrocardiograph apparatus generally designated 16, as shown in FIGURE 6.

The elongated tubular member 10 is preferably formed of some suitable plastic material which, while relatively rigid, is nevertheless somewhat flexible and is smooth enough to be inserted intra-vaginally and intrauterine without causing any injury to either the mother or the infant. One suitable form of instrument has the member 10 about 42 inches in length and 1 centimeter in diameter.

The inflatable means 12 includes at its distal end, a pair of inflatable balloon members formed by a proximal balloon 18 located along the member 10 approximately 5 to 7 inches from the end thereof and a distal balloon 20 located at the extreme end of the member 10. Each of the balloons is fabricated of a flexible or, if desired, elastomeric material which is thin enough to allow the balloon to be readily inflated or deflated. In order to inflate the balloon members, a pair of supply conduits 22 and 24 extend through the tubular member 10 and merge into the balloons themselves. As can best be seen from FIGURE 3, the conduit 22 merges into the balloon 18 while the conduit 24 projects through the balloon 18 and merges into the balloon 20. Both of the conduits 22 and 24 connect at the handle end of the member 10 to a fluid supply line 26 which can be connected to a suitable source of fluid, such as air. In practice, it has been found that a manually compressible bulb pump, not shown, can be efficiently used to supply air through the line 26. A switch valve 28 is mounted in the handle 10 to direct the air or fluid from the line and into one or the other of the conduits 22 and 24. Since the switch valve will not permit air to enter both conduits at once, it will be apparent that the balloons are separately inflated. The switch valve 28 is also movable to exhaust positions to allow the balloons 18 and 20 to be deflated, when this is desirable. Preferably, the balloons assume a spherical configuration when inflated.

A plurality of electrodes generally designated 26 are disposed, preferably equatorially, around the exterior of the balloon members 18 and 20. Each electrode 26 includes a plate 28 having an opening 30 formed therein. An electrical lead 32 connects to each of the plates 30 and extends through the interior of the tubular member 10 to the handle end thereof. Each of the leads 32 extends along the exterior of the balloon to a common point whereat all of the leads project through the balloon wall together. As shown in FIGURE 3, six electrode plates are spaced equally about the exterior of the balloon 20 and consequently six leads 32 project through the outermost end of that balloon. These six leads exit from the bottom wall of the balloon 20 and then project through the outermost end of the balloon 18 and then through its bottom wall. The six leads from the balloon 18 extend along its periphery and enter the member 20 at its junction with the balloon 18. Consequently, between the balloon 18 and the handle end of the member 10, twelve leads 32 extend along the interior of the member 10.

At the handle end of the tubular member 10, all of the leads 32 connect to a female plug portion 34 which forms a part of the electrical means 14. A switch member 36 having male prongs extending therefrom forms the other part of the electrical means 14 and is adapted to be connected to the portion 34. The member 36 has two manually operable switches 38 and 40, one of which controls the electrode plates 28 associated with the balloon 18 and the other of which controls the electrode plates 28 associated with the balloon 20. The switch member 36 can be connected to the electrocardiograph apparatus 16 by a conventional plug-in lead connection, as shown in FIGURE 6.

In order to assure a more positive electrical contact between the infant's body and the electrode plates, a conductive substance is used in conjunction with the instrument 8. Since such a substance cannot be effectively preplaced on the electrodes because of its tendency to rub off during insertion of the instrument into the uterus, it thus is necessary to provide some means for introducing the conductive substance to the electrodes after the instrument has been inserted intrauterine. To this end, a pair of conductive solution supply tubes 42 and 44 are provided respectively for the balloons 18 and 20. The tube 42 branches out at the balloon 18 into six separate branch tubes 42a, each of which extends along the outside of the balloon to connect one branch tube to each electrode plate 28. The tube 44 projects through the balloons 18 and 20 and at the outermost end of the balloon 20, branches into six similar branch lines 44a which are connected similarly to the six electrode plates on the balloon 20. Both tubes 42 and 44 connect at the handle or proximal end of the member 10 to a conductive solution supply line 46 which can in turn be connected to a suitable source of conductive solution, such as a saline solution. A switch valve 48 is mounted in the member 10 to direct the solution into either the tube 42 or the tube 44. When such solution flows through the tube, it passes into the branch lines thereof and exhausts through the openings 30 in the electrode plates 28.

In order to render the exterior of the balloons smooth so they will not be injurious to either the mother or the infant, a smooth shell or envelope 50 extends from each electrode plate 28 to the area where the leads 32 and branch tubes enter the tubular member 10. As shown in FIGURE 4, within each envelope 50, there are housed one lead and one branch tube.

In order to explain the operation of the instrument and the method steps carried out in its use, reference is now made to FIGURE 5 wherein an infant 52 is shown within a uterus 54. It will be noted that the infant's head is adjacent the cervix 56, which is the customary "head-first" position in which an infant is delivered. The instrument 8 is introduced intravaginally through the cervix 56 and into the uterus 54. When properly positioned, the balloons 18 and 20 are separately inflated. If a hand bulb pump is used, the bulb is operated until a positive pressure is felt, thus indicating that the balloon has contacted the body of the infant 52. Next, conductive solution is introduced through the instrument to exhaust at each of the electrodes 26. At this point, at least one of the electrode plates 28 on each balloon should be in contact with the infant's body and out of contact with the wall of the uterus, and the conductive solution exhausting through the opening 30 in this plate will assure that an electrical contact exists between the plate and the infant. The switches 38 and 40 are then experimentally turned until they are directed to the electrode plates which are touching the infant's body. When this is done, the electrical impulse from the infant's body will be transmitted to the electrocardiograph apparatus 16 to give a tracing of the infant's cardiac pattern.

It is important to note that the construction of the instrument 8 assures that once contact is made between an electrode and the infant, the balloons assure that such contact will be kept, even during uterine labor contractions. Also, since the particular electrode plates from which the readings are taken are only in contact with the infant and are not in contact with the mother, there is no chance of the mother's heart impulse becoming superimposed upon the infant's heart impulse and thus drowning it out.

Using the instrument 8 as shown, the proximal balloon 18 contacts the infant's shoulder and the distal balloon 20 contacts the infant's hip-thigh area. Thus, the readings at the apparatus 16 will be right shoulder-right hip or left shoulder-left hip. If two instruments 8 are simultaneously placed intrauterine, then four infant contact points can be made; right and left shoulder and right and left hip. With four contact points, an adult-type electro-cardiogram can be taken from the infant.

After reading the foregoing detailed description, it should be apparent that the objects set forth at the outset of this specification have been successfully achieved. Accordingly, what is claimed is:

1. An electrocardiac instrument for intrauterine use in testing unborn infants, said instrument comprising;
   an elongated tubular member;
   at least two inflatable means mounted adjacent one end of said tubular member and spaced apart by a predetermined distance;
   electrode means on each of said inflatable means;
   electrical connection means for selectively attaching said instrument to an electrocardiogram apparatus; and
   means for inflating each of said inflatable means within an intrauterine location to bring said electrode means into contact with an infant therein for obtaining an electrocardiogram tracing from said infant;
   and said electrode means thus contacting said infant at different locations on said infant with said different locations being spaced apart by said predetermined distance.

2. An instrument as defined in claim 1 wherein said inflatable means includes at least one balloon member having a supply conduit extending through said tubular member whereby fluid can be selectively supplied through said supply conduit to inflate said balloon member.

3. An instrument as defined in claim 2 wherein said electrode means includes a plurality of separate electrode plates spaced circumferentially about the exterior of said balloon member.

4. In an electrocardiac instrument:
   at least two inflatable balloon means spaced apart by a selected distance;
   means for inflating said balloon means; and
   a plurality of electrodes attached to each of said balloon means along the exterior surface thereof whereby, when said balloon means is inflated, at least one of said electrodes on each balloon means will contact the subject which is to be given the electrocardiogram, and hence two electrode contact points on said subject will be established, said contact points being spaced apart by said selected distance.

5. For use in obtaining an electrocardiogram of an unborn infant, an instrument capable of intrauterine use comprising:
   an elongated tubular handle portion;
   at least one inflatable balloon member at one end of said handle portion;
   a supply conduit extending from said balloon member through said tubular handle portion to be connected to a fluid supply which can selectively inflate said balloon member;
   a plurality of electrodes disposed about the exterior of the balloon member;
   a lead extending from each of said electrodes through said tubular handle portion to be connected to an electrocardiogram apparatus; and
   at least one conductive solution tube extending through said tubular handle portion and terminating at each of said electrodes;
   said conductive solution tube being adapted to be connected to a supply source of conductive solution which can be transmitted through said tube to said electrodes;
   said balloon member being inflatable to bring at least one of said electrodes into contact with said infant to permit an electrocardiogram to be taken from said infant.

6. An instrument as defined in claim 5 wherein said supply conduit is provided with a switch valve to permit said balloon to be inflated and deflated in a selective manner.

7. An instrument as defined in claim 5 wherein said leads connect to a manually operable switch means.

8. An instrument as defined in claim 5 wherein said leads and said conductive solution tubes extend along the exterior of said balloon to said electrodes.

9. An electrocardiac instrument for intrauterine use in obtaining an electrocardiogram of an unborn infant, said instrument comprising:
   an elongated tubular member;
   a pair of inflatable balloon members disposed at one end of said tubular member;
   said balloon members being spaced apart a finite distance;
   a plurality of electrode plates disposed about the exterior of each of said balloon members;
   said electrode plates each having an opening therein;
   a conductive solution supply tube extending through said elongated tubular member;
   said conductive solution supply tube diverging into branch tubes at each of said balloon members with one branch tube extending to each one of said electrode plates;
   said conductive solution supply tube being provided, at the end opposite said balloon members, with a manually operable valve means which, when opened, allows conductive fluid to flow from a source thereof to and through said openings in said electrode plates;
   a plurality of electrical leads extending through said elongated tubular member;
   one end of said electrical leads being attached to a manually operable switch means;
   the other ends of said electrical leads extending across the exterior of said balloon members and being attached to said electrode plates, with one separate lead being attached to each one of said electrode plates;
   at least one fluid supply conduit extending through said elongated tubular member;
   said fluid supply conduit connecting separately to each of said balloon members;
   said fluid supply conduit being connected at the end opposite said balloon members to a manually operable valve means which, when opened, allows fluid to flow from a source thereof to a selected one of said balloon members for inflation thereof;
   said instrument being adapted to be connected to an electrocardiogram apparatus whereby, when said balloon members are inflated to bring said electrode plates into contact with an infant's body, the electrical impulses from the infant will create a tracing on said electrocardiogram apparatus.

10. An electrocardiac instrument as defined in claim 9 wherein said balloon members are substantially spherical when inflated.

11. An electrocardiac instrument as defined in claim 10 wherein said electrode plates are equatorially arranged about the exterior of said balloon members.

12. A method of obtaining an electrocardiogram of an unborn infant comprising the steps of:
   inserting at least one instrument having a pair of spaced apart electrode carrying inflatable end portions into an intrauterine location beside the infant therein;

inflating the inflatable end portions of said instrument to bring the electrodes thereon into contact with spaced apart points on said infant; and transmitting the electrical impulse which the infant imparts on said electrodes to an electrocardiogram apparatus.

13. A method as defined in claim 12 but further characterized by the step of introducing a conductive solution between the infant and the electrodes after said end portions have been inflated.

References Cited

UNITED STATES PATENTS

| 1,637,829 | 8/1927 | Lurie | 128—418 |
| 3,034,500 | 5/1962 | Bakster | 128—2.1 |
| 3,120,227 | 2/1964 | Hunter et al. | 128—2.06 |

RICHARD A. GAUDET, *Primary Examiner.*

S. BRODER, *Assistant Examiner.*